United States Patent [19]

Rardin et al.

[11] 4,226,393
[45] Oct. 7, 1980

[54] SNAP-IN LOCKING DEVICE FOR ELECTRICAL WIRING DEVICE BOXES

[76] Inventors: Jack A. Rardin; Byron C. Rardin, both of 617 18th St., Charleston, Ill. 61920

[21] Appl. No.: 29,497

[22] Filed: Apr. 12, 1979

[51] Int. Cl.³ .............................................. A47B 96/06
[52] U.S. Cl. .................................. 248/205 R; 174/58; 220/3.9; 248/27.1
[58] Field of Search ............ 248/205 R, DIG. 6, 27.1, 248/27.3; 220/3.4, 3.5, 3.6, 3.9; 174/57, 58

[56] References Cited

U.S. PATENT DOCUMENTS

| | | | |
|---|---|---|---|
| 1,847,169 | 3/1932 | Buchanan | 220/3.6 X |
| 2,299,696 | 10/1942 | Gregersen | 220/3.6 |
| 2,309,189 | 1/1943 | Hancock et al. | 220/3.6 |
| 2,762,591 | 9/1956 | Weber | 248/27.1 |
| 3,448,952 | 6/1969 | Swanquist et al. | 248/27.1 |
| 3,963,204 | 6/1976 | Liss | 248/DIG. 6 X |
| 4,120,416 | 10/1978 | Suk | 248/27.1 X |
| 4,183,486 | 1/1980 | Esoldi | 248/205 R |

FOREIGN PATENT DOCUMENTS 1394766  3/1965  France ........................................ 174/58

*Primary Examiner*—J. Franklin Foss

*Attorney, Agent, or Firm*—Ernest Kettelson

[57] ABSTRACT

An anchoring or locking device to enable snap-in installation of boxes for electrical wiring devices in which the snap-in locking device is separate from the box and may be used universally with all types of boxes. The locking device includes a mounting base plate and means to attach the base plate to the side walls or to the top and bottom walls of an electrical wiring device box, the base plate having resilient fingers or extensions projecting therefrom at an incline starting from a point rearward of the box on which the device is mounted and extending at an acute angle from such point in a direction toward the front portion of the box. The projecting fingers or extensions are compressed inwardly toward the base plate when the box on which the locking device is mounted is pushed into the hole provided for the box in the wall on which it is to be mounted. When the box is inserted the proper distance the projecting resilient fingers clear the inner edge of the wall opening and snap back to their original position thereby locking the wiring device box in place. A wall plate is provided for coupling to the locking device from the front thereby sandwiching the edge of the wall adjacent the opening between the wall plate and the locking device.

21 Claims, 16 Drawing Figures

U.S. Patent    Oct. 7, 1980    Sheet 1 of 5    4,226,393
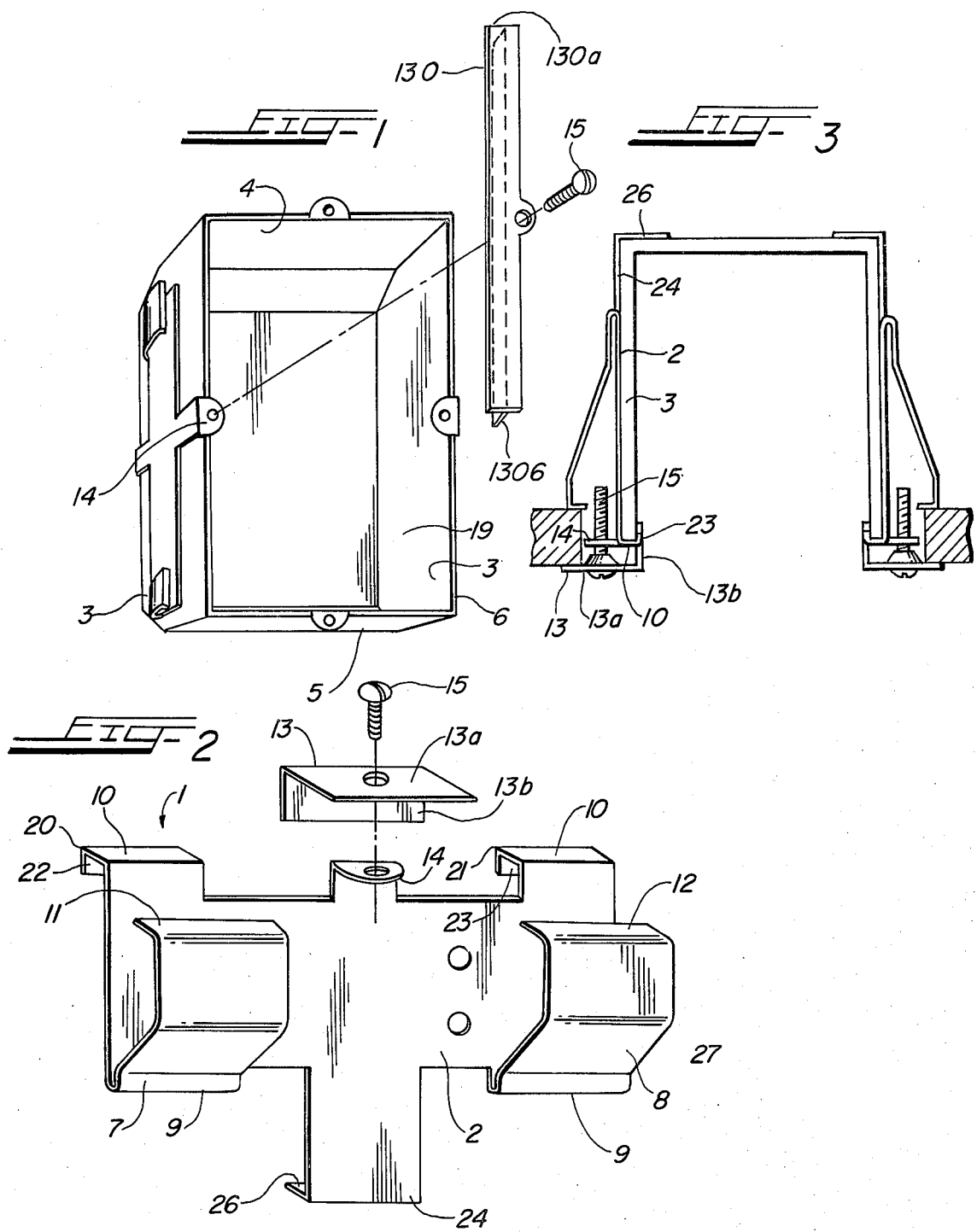

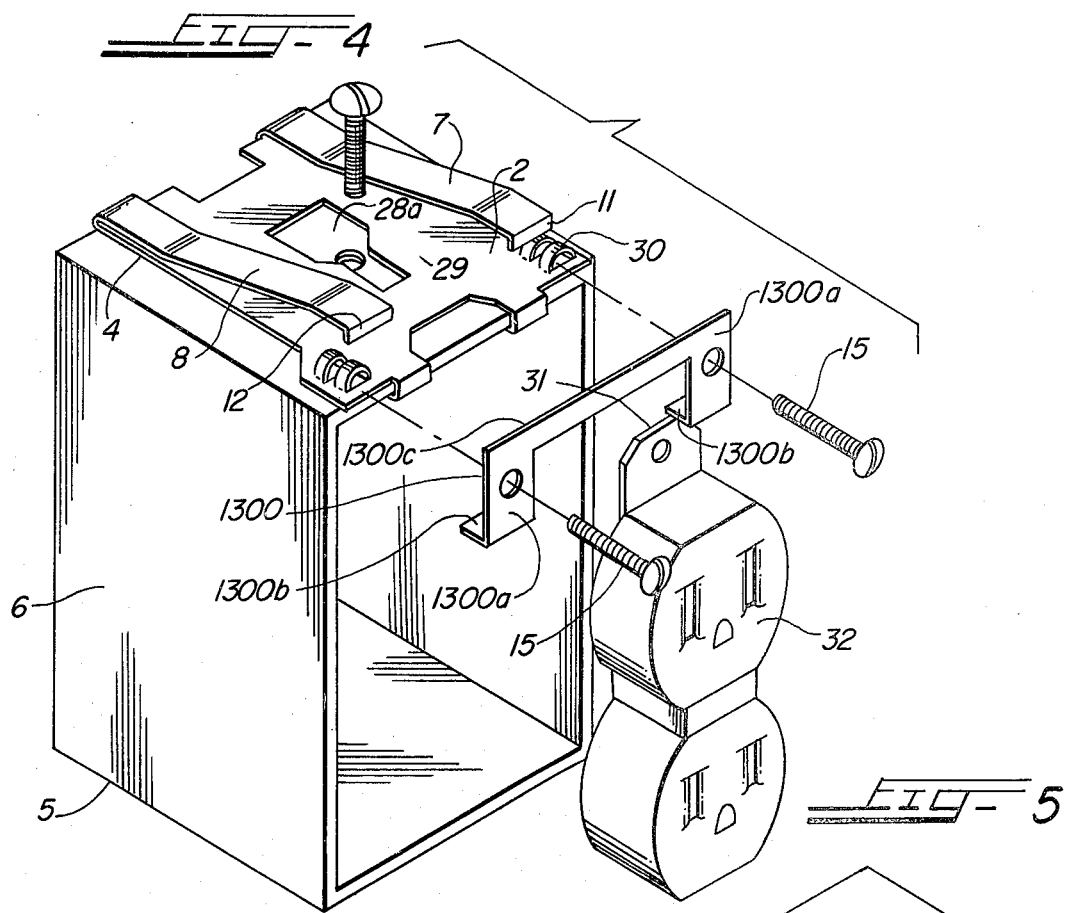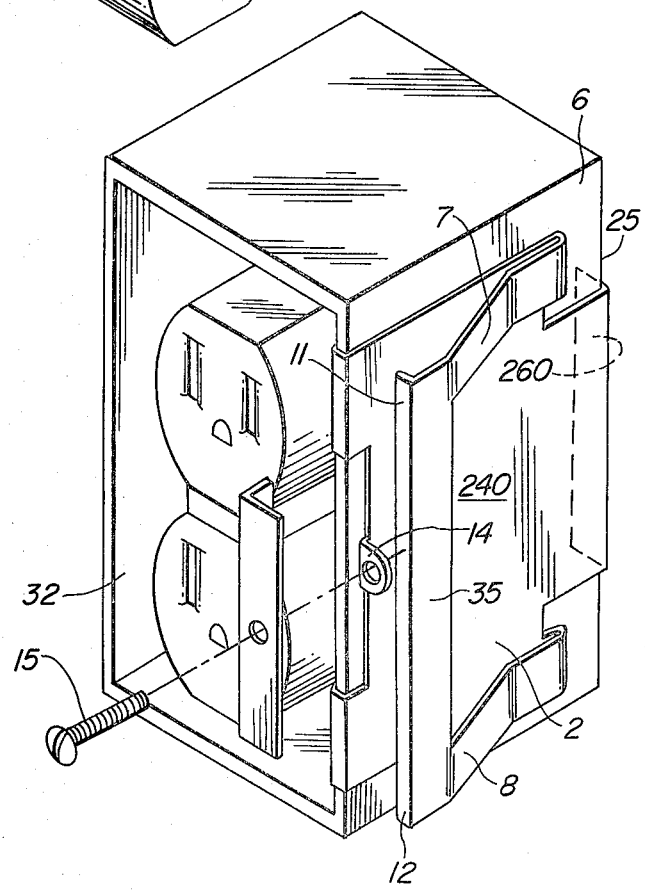

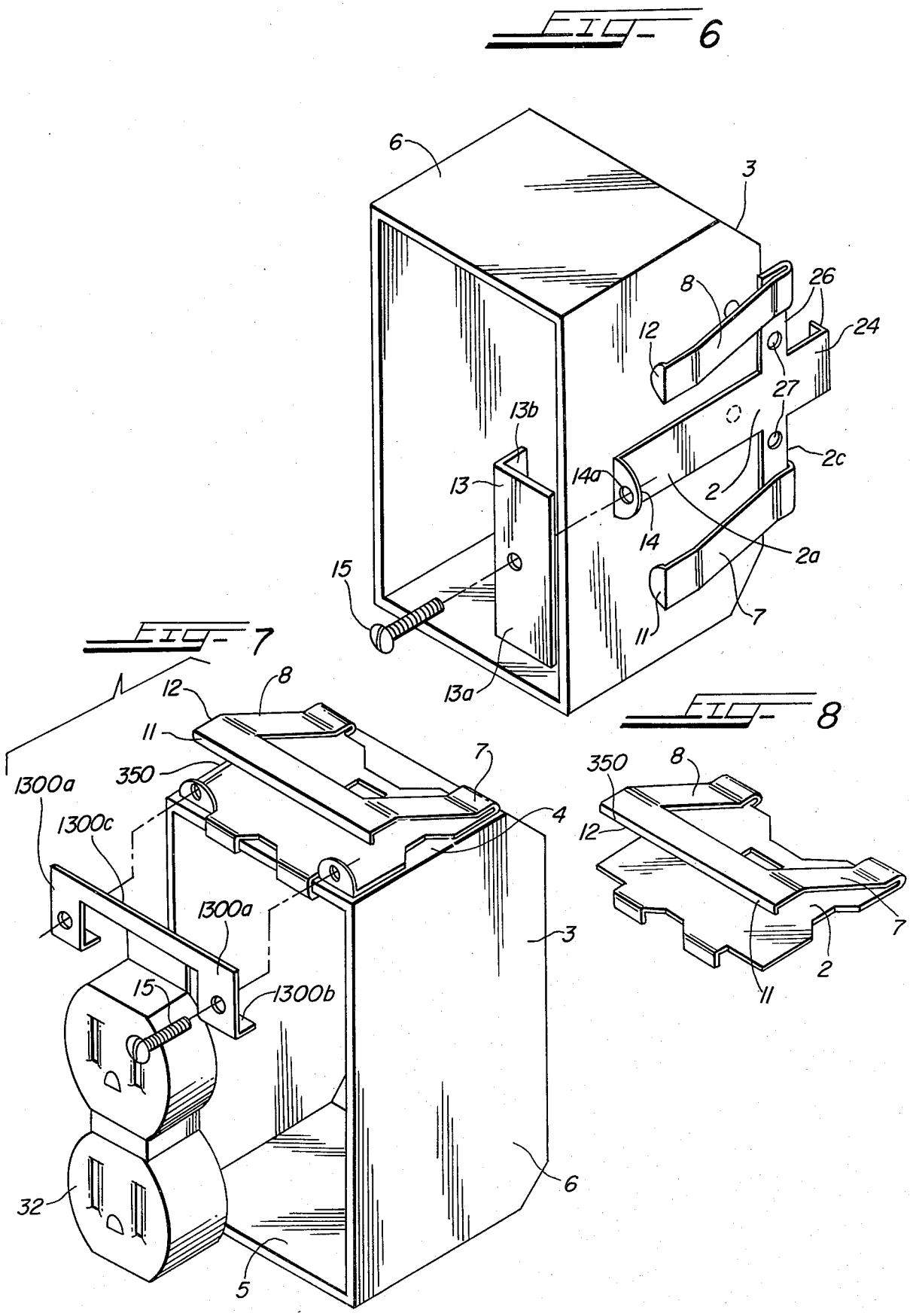

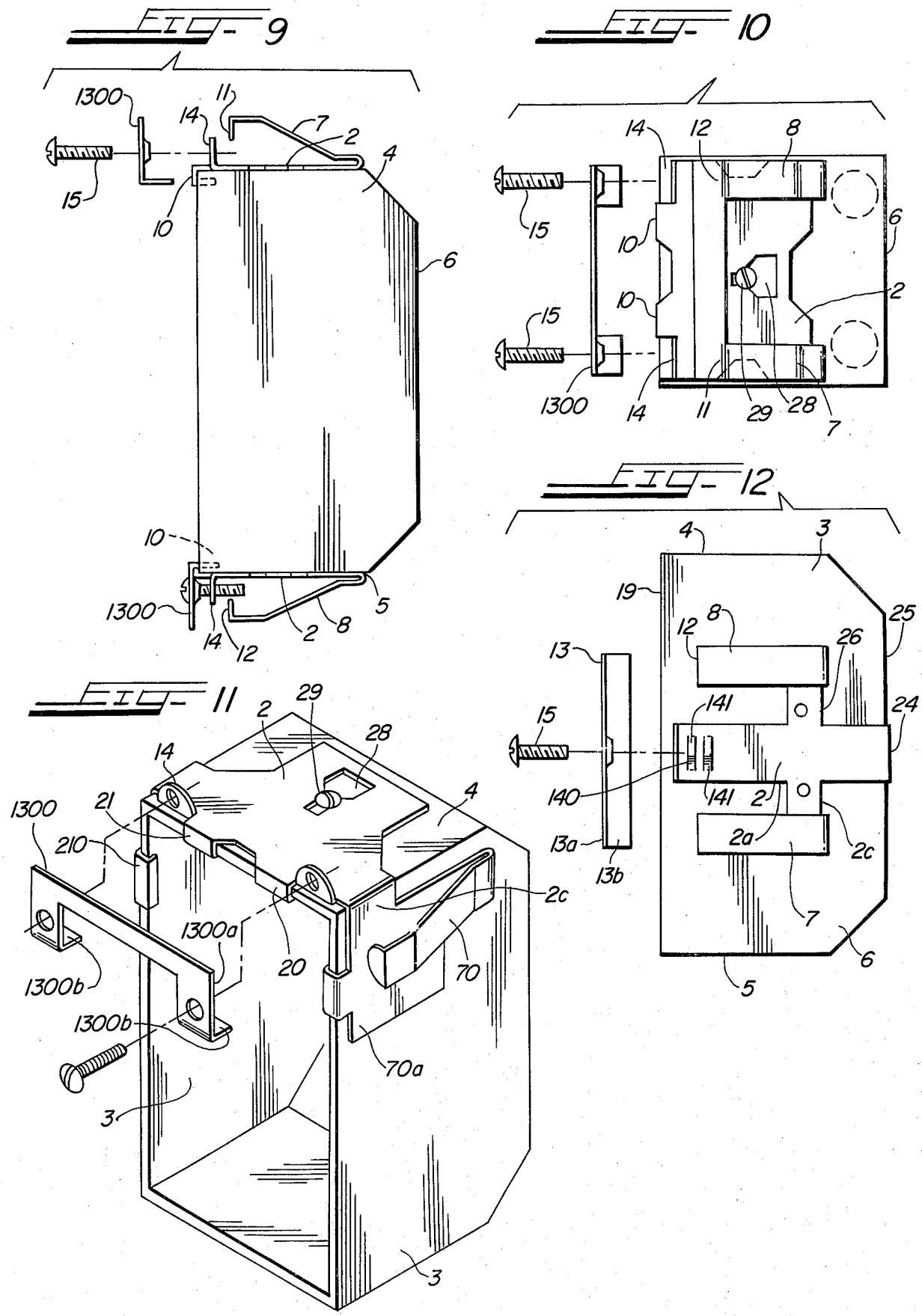

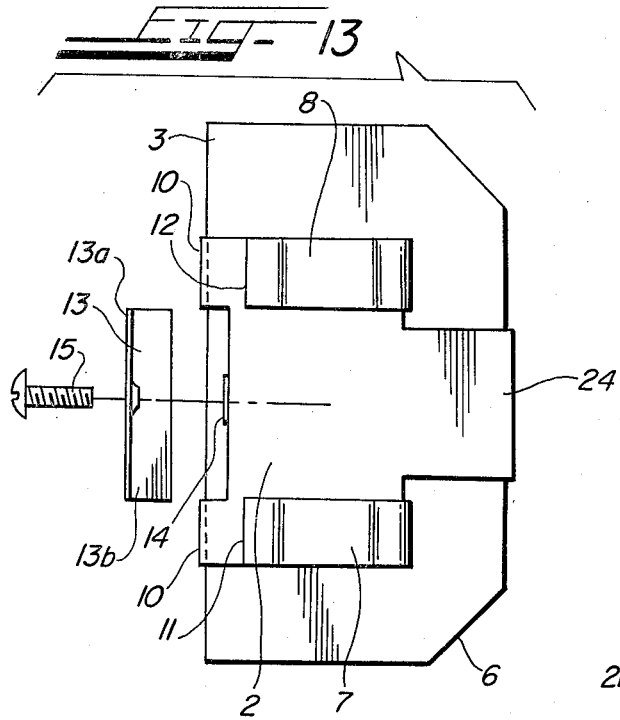
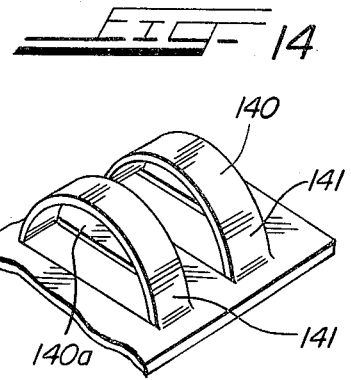
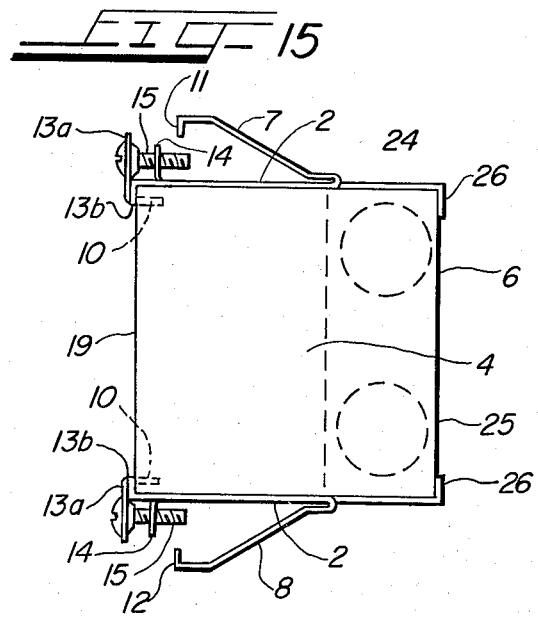
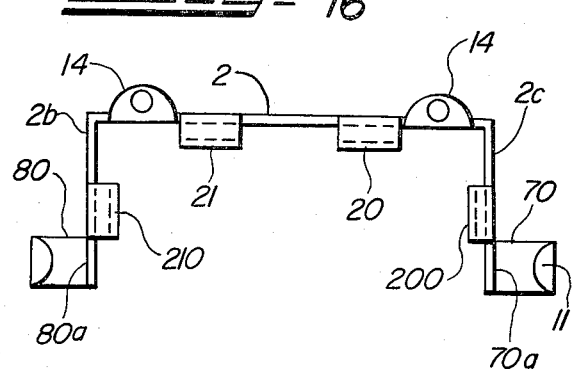

SNAP-IN LOCKING DEVICE FOR ELECTRICAL WIRING DEVICE BOXES

BACKGROUND OF THE INVENTION

This invention relates to the field of boxes for electrical wiring devices and snap-in locking devices which enable mounting such boxes in a wall by inserting through a hole provided for such purposes whereupon the locking device snaps back to hold the box in place.

Many of the previous devices of this type have been formed integrally as part of the side walls or top and bottom walls of the box, particularly in the case of plastic or non-metallic wiring device boxes. Such integrally formed snap-in devices have proven to be unsatisfactory in practice because they depend on the resilience of the side walls or top and bottom walls of the plastic boxes to provide the flexing and rebound, or the snap-back characteristic. Such boxes with integrally formed snap-in type locking devices are usually made of thermoplastic materials which do not always return to the original position after being flexed. The side walls, for example, of thermoplastic electrical boxes tend to bow inwardly and to become softened when temperatures rise. When this happens the integrally formed locking members are also drawn inwardly and become softened whereby the boxes become loose and may even be unintentionally withdrawn from their wall mountings. There is also a limited and undesirable amount of movement between the flexed and unflexed position of the locking members which are integrally formed on the wall of a wiring device box. A separate detachable snap-in locking device can easily overcome this problem because it can be made of other materials such as metals which have excellent rebound characteristics, as well as good temperature characteristics.

Some of the known prior art locking devices of the snap-in type for electrical wiring device boxes can be removed from the box by cutting the rivets with which they are attached or by removing the screws which secure the devices to the box. However, such devices are made for particular types of wiring device boxes and are not for universal use with wiring device boxes of all types, including those which do not incorporate the special features needed for the prior art devices to function.

Another problem with prior art locking devices of the snap-in type is spacing of the snap-in members or fingers from the front open wall of the box a proper distance to enable the forward edges of the snap-in member to bear tightly against the inner surface of the mounting wall when the box has been finally secured in its proper position, which usually requires that the open front wall of the box is either flush with the other surface of the mounting wall or set inwardly therefrom a distance so the box in any event does not project outwardly from the outer surface of the wall on which it is mounted. When this is done with boxes having known prior art locking devices of the snap-in type, the forward edges of the snap-in members are often set back from and spaced apart from the inner surface of the mounting wall, and the box is therefore not mounted tightly and securely in place.

The detachable locking device of the snap-in type in accordance with the present invention overcomes the foregoing problems and difficulties.

SUMMARY OF THE INVENTION

It is an object of the invention to provide a detachable snap-in locking device for electrical wiring device boxes in which the locking device may be used universally with any type of wiring device box.

It is an object of the invention to provide a detachable locking device of the snap-in type for electrical wiring devices boxes, including a base plate for attachment to the wall of a wiring device box, and resilient fingers extending outwardly from the base plate at an acute angle, the free ends of such resilient fingers being positioned to bear tightly against the inner surface of the wall in which the wiring device box is mounted when said box is finally positioned and mounted for use, and a wall plate coupled to said locking device to sandwich the edge of the mounting wall between the free ends of the resilient fingers and said wall plate.

It is an object of the invention to provide a detachable locking device of the snap-in type for electrical wiring device boxes, including a base plate for attachment to the wall of said wiring device box, said base plate including an inturned lip along its front edge to provide groove means to receive an edge portion of the wall of the wiring device box at the open front wall thereof, said base plate of said locking device including an inwardly turned flange at its opposite end to bear against the rear wall of the wiring device box after the front edge portion of the wiring device box wall has been received in the groove formed by the inwardly turned portion of the base plate at its other end, the base plate of the locking device being thereby secured to the wall of the electrical wiring device box and grippingly held against both lateral and longitudinal movement relative to said box.

It is an object of the invention to provide a detachable locking device having snap-in members for an electrical wiring device box, including a base plate for attachment to the wall of said wiring device box and in which said base plate includes one or more apertures for alignment with existing screws already provided as part of said wiring device box construction, to utilize said screws in securing said base plate of said locking device to the wall of said wiring device box.

It is an object of the invention to provide a detachable locking device having snap-in members for use with boxes for electrical wiring devices, including a wall plate member for coupling to said locking device to sandwich the edge of a mounting wall surrounding the mounting aperture between said wall plate and said snap-in members of said locking device, and in which said locking device and wall plate coupled thereto are adjustable for use with walls of differing thicknesses and to enable positioning said wiring device box at different locations relative to the plane of the outer surface of the mounting wall.

BRIEF DESCRIPTION OF THE DRAWINGS

FIG. 1 is a perspective view of a locking device in accordance with this invention shown mounted along the side wall of an electrical wiring device box.

FIG. 2 is an isometric view of the locking device in accordance with this invention showing the wall plate and mounting screw spaced apart from the locking device.

FIG. 3 is a top plan view of an electrical wiring device box mounted in a wall opening having the locking device in accordance with the present invention attached thereto and with the top wall of the box removed.

FIG. 4 is an isometric view of a modification of the locking device in accordance with this invention shown mounted on the top wall of an electrical wiring device box, also showing the relationship of the modified wall bracket with an electrical receptacle to be mounted in said box.

FIG. 5 is an isometric view of another modification of the locking device in accordance with this invention.

FIG. 6 is an exploded isometric view of another modification of the locking device in accordance with this invention with its relationship to an electrical wiring device box shown, the box being illustrated in phantom by broken lines.

FIG. 7 is an isometric view of another modification of the locking device in accordance with this invention, with the wall bracket, mounting screws and electrical receptacle shown in an exploded view.

FIG. 8 is an isometric view of another modification of the locking device in accordance with this invention.

FIG. 9 is a side elevation view of the locking device in accordance with this invention shown mounted on the top and bottom walls of an electrical wiring device box with a top wall bracket and adjusting screw shown in an exploded view position.

FIG. 10 is a top plan view of the locking device and box shown in FIG. 9.

FIG. 11 is an isometric view of another modification of the locking device in accordance with this invention shown mounted on an electrical wiring device box.

FIG. 12 is a side elevation view of the modified locking device in accordance with this invention shown in FIG. 6, including an additional modification.

FIG. 13 is a side elevation of the modified locking device similar to the one shown in FIG. 5.

FIG. 14 is a perspective fragmentary view of a stamped collar screw receiving and retaining structure in place of a threaded tab as shown in the modification illustrated in FIG. 12.

FIG. 15 is a top plan view of a wiring device box having a pair of locking devices in accordance with the invention mounted on the side walls thereof.

FIG. 16 is a front elevation view of a modified form of the invention shown in FIG. 11.

DESCRIPTION OF PREFERRED EMBODIMENT

A detachable locking device 1 includes a base plate 2 for attachment to either side walls 3, or to a top wall 4 and a bottom wall 5, of an electrical wiring device box 6. Resilient fingers or members 7 and 8 project outwardly at an acute angle from the rear edge 9 of the base plate 2. The resilient fingers 7 and 8 project forwardly in a direction toward the front edge 10 of the base plate 2, and they terminate in free ends 11 and 12 respectively at a distance spaced inwardly from the front edge 10 a predetermined distance depending on the thickness of the walls in which a particular detachable locking device is going to be used. A wall bracket 13 is provided for coupling to a laterally extending tab 14 extending from and substantially perpendicular to the plane of the base plate 2. The tab 14 has an internally threaded aperture to receive an adjusting and securing screw 15 which couples the wall bracket 13 to the base plate 2 of the locking device 1, sandwiching the edge 16 of the mounting wall 17 between the wall bracket 13 and the free ends 11 and 12 of the resilient fingers 7 and 8, as illustrated in FIG. 3.

The wall bracket 13 is L-shaped having two elongated leg portions 13a and 13b extending at substantially right angles to each other. The elongated leg portion 13a lies parallel to and bears against the outer surface of the mounting wall 17 when the box is mounted in place, and the other elongated leg portion 13b extends inwardly of the box 6 parallel to and adjacent to the inner surface of the side wall 3 of the wiring device box 6. The elongated leg portion 13b thereby forms a locking groove 18 with the portion of base plate 2 adjacent its forward end 10 to receive therein the edge portion of side wall 3 of box 6 which terminates in and surrounds the open front wall 19 of box 6.

The base plate 2 may also include inwardly turned L-shaped lip portions 20 and 21 along the front edge 10 of base plate 2 to provide locking grooves 22 and 23 to also receive the front edge portion of side wall 3 of box 6, whereby the locking device 1 may be secured to the wall 3 of box 6 before the wall bracket 13 has been coupled thereto.

A rearwardly extending member 24 is provided to extend rearwardly from base plate 2 a distance sufficient to reach the rear wall 25 of wiring device box 6 when the locking device 1 is mounted thereon. An inturned flange 26 extends at a right angle from the free end of rearwardly extending member 24 to grippingly bear against an edge portion of a rear wall 25 of wiring device box 6. Thus when the locking device 1 is mounted on the side wall 3 of box 6, the inturned flange 26 grippingly bears against rear wall 25 of box 6 and the locking grooves 22 and 23 provided by inturned L-shaped lip members 20 and 21 at the front portion of the base plate 2 receive front end portions of side wall 3 of box 6 to secure the locking device to the box and prevent lateral and longitudinal movement of one relative to the other.

It will be appreciated that the spacing of the free ends 11 and 12 of the resilient fingers 7 and 8 from the front edge 10 of base plate 2 is not the sole determining factor as far as the thickness of mounting walls is concerned with which the locking device may be used. The wall plate 13 also provides an adjusting feature enabling use of a particular locking device in accordance with this invention with a mounting wall which is thicker than the distance between free ends 11 and 12 of the resilient fingers 7 and 8 and the front edge 10 of base plate 2. This adjusting feature consists of the fact that wall plate 13 is detachably coupled to the base plate 2 by adjusting screw 15, so the spacing between the leg 13a of wall plate 13 and the free ends 11 and 12 of resilient fingers 7 and 8 can be adjusted to accomodate mounting walls of different thicknesses. The adjusting screw 15 can be tightened against the wall plate 13 until the resilient fingers 7 and 8 bearing against the inner surface of the mounting wall begin to bow slightly and allowing the box 6 to be drawn flush with the outer surface of the mounting wall.

The locking device 1 in accordance with this invention may also be factory installed by the box manufacturer, in which case apertures 27 are provided in base plate 2 for insertion of rivets or bolts to enable riveting or bolting of base plate 2 to the side wall 3 of a wiring device box 6. In such case, the tab 14 having a threaded aperture to receive screw 15 may be turned inwardly of the open front wall 19 of wiring device box 6. In this modified form of the invention, the wall bracket 130 is T-shaped having an elongated top or cross portion 130a and an elongated leg portion 130b. In this modification the elongated leg portion 130b is placed along the outer surface of side wall 3 when screw 15 is screwed into the threaded aperture in tab 14 to couple the wall bracket 130 to the base plate 2 of the locking device 1. When so coupled, the elongated leg 130a which forms the top portion of the T-shaped wall bracket 130 bears against the outer surface of the mounting wall 17 to sandwich the edge 16 thereof between wall bracket 130 and the free ends 11 and 12 of resilient fingers 7 and 8.

The modification shown in FIG. 4 includes a slotted aperture 28 in base plate 2 to receive therethrough the shank of an existing screw 29 provided as part of the wiring device box construction. The base plate 2 of the locking device 1 may thereby be secured to the top wall 4 as shown in FIG. 4 by loosening existing screw 29, placing the base plate 2 on the top wall 4 of box 6, sliding the base plate 2 rearwardly to seat the shank of screw 29 in slot 28a, and then re-tightening screw 29 to tighten base plate 2 against the wall 4 of box 6. A modified form of wall bracket 1300 is provided for use with this form of invention as shown in FIG. 4. This modified form of the wall bracket is L-shaped, and includes two long legs 1300a and two short legs 1300b, a cross member 1300c which connects the spaced apart legs 1300a at their free ends, or their ends which are opposite the ends which adjoin short legs 1300b. Each of the long legs 1300a include apertures through which screws 15 extend for threaded engagement with stamped collars 30 provided in base plate 2 in alignment with the apertures in legs 1300a of wall bracket 1300 when coupled to the base plate 2 in alignment with the apertures in legs 1300a of wall bracket 1300 when coupled to the base plate 2. This construction of wall bracket 1300 provides a recess 31 bounded by legs 1300a and cross member 1300c in which the mounting tab of a receptacle 32 may be received for mounting in the wiring device box 6. Collars 30 may be formed in base plate 2 by stamping, and are formed of a dimension to provide a bore or aperture therethrough which grippingly receives and holds screws 15 when threaded therein.

It is to be understood that a locking device 1 of like construction would also be mounted on the bottom wall 5 of the box shown in FIG. 4 to provide snap-in locking means for the box 6 on both the top and bottom walls thereof. The same is to be understood with respect to locking devices mounted on the side walls 3, that is a locking device 1 is mounted on each opposite side wall 3.

FIG. 5 illustrates a slightly modified version of the locking device in accordance with this invention mounted on a wiring device box 6 in which a receptacle 32 has been mounted. The rearwardly projecting member 240 in this modification is relatively broad as is the inwardly turned flange 260 to provide a more secure grip against the rear wall 25 of the box 6.

Also, a connecting member 35 extends between free ends 11 and 12 of resilient fingers 7 and 8 to provide greater strength to that portion of the locking device which bears against the inner surface of the mounting wall when the box 6 is completely mounted in place.

FIG. 6 illustrates another modification of the locking device wherein a minimum amount of material is used. A slender strap 2a extends forwardly from a minimum base portion 2 and the tab 14 is formed at the end of the slender strap 2a. Lateral strap portions 2b and 2c extend laterally from the minimum base portion 2 from which the resilient fingers 7 and 8 extend. In the modification shown in FIG. 6 the locking grooves 22 and 23 are not present, and the only locking grooves provided for the front edge of the side wall 3 of box 6 is that formed by leg 13b of wall bracket 13 in conjunction with the strap 2a, sandwiching the adjacent edge portion of wall 3 of box 6 therebetween when screw 15 is threaded through the threaded aperture in tab 14. This modification also lends itself to factory installation.

The modification shown in FIG. 7 is similar to that shown in FIG. 4. The modification shown in FIG. 7 includes a solid connecting portion 350 between the free ends 11 and 12 of the resilient fingers 7 and 8.

It will be seen from FIG. 9, which shows the invention in side elevation that the tab 14 may be inset somewhat from the front edge 10 of the base plate 2. The tab 14 projects outwardly a very small distance and is able to pass through the wall opening provided for the wiring device box in this modification as shown in FIG. 9. In other modifications of the invention the tab 14 can be set back as in FIG. 9 or be set substantially flush with the open front wall 19 of the box 6 when the locking device is mounted thereon.

The modification shown in FIG. 12 is similar to that shown in FIG. 6, in that a minimum amount of metal is required. However, in lieu of the tab 14 shown in FIG. 6 which has a threaded aperture 14a to receive and retain threaded screw 15, the locking device shown in FIG. 12 is provided with a stamped collar 140 formed by stamping a pair of strips 141 out of the metal of the forwardly extending slender strap 2a, the strips 141 fracturing along their side edges but remaining integrally joined to the body of strap 2a at each opposite end. The results are arcuately formed strips 141 which define a semi-circular through passageway 140a of a size and dimension to frictionally receive the threaded shank of retaining screw 15. The wall plate or bracket 13 may therefore be coupled to the strap 2a of base plate 2 in this modification by inserting screw 15 through the aperture in leg 13a, then into the through passageway 140a until the threaded end portion of screw 15 frictionally engages the first arcuate strip 141. The screw 15 is then rotated in the direction which causes the threads in frictional contact with the arcuate strips 141 to draw the screw 15 inwardly, and it is so rotated until the leg 13a of wall bracket or plate 13 bears against the outer surface of the mounting wall in which the box is mounted and the free ends 11 and 12 of resilient fingers 7 and 8 respectively bear against the inner surface of such mounting wall, thereby sandwiching the mounting wall therebetween.

The modification shown in FIG. 11 is similar to the modification shown in FIG. 4 and FIG. 7. However, even though the base plate 2 is secured to the top wall 4 of the box 6 by an original box screw 29, the resilient fingers or arms 70 and 80 are positioned to extend outwardly from respective side walls 3 of the box. The base plate 2 in this modification extends laterally across the top wall 4 of box 6 to the opposite side edges, whereupon an integrally formed leg 2c extends downwardly along one side wall 3 of box 6 when mounted thereon to plate 70a from which resilient arm 70 extends and another integrally formed leg 26 extends downwardly along the opposite side wall 3 to a similar plate 80a from which resilient arm 80 extends. In this modification, two additional L-shaped lips 200 and 210 are provided similar to L-shaped lips 20 and 21 which extend from the forward edge of base plate 2 to frictionally receive facing edge portions of the box walls. The lips 200 and 210 extend from the plates 70a and 80a respectively which lie against respective side walls 3 when mounted in place on box 6, and lips 200 and 210 frictionally receive respective facing edge portions of side walls 3 to help retain the locking device more securely to box 6.

To use the snap-in locking device in accordance with this invention, one locking device is placed alongside of one side wall (or a top or bottom wall, depending on the modification used) and the L-shaped lips 20 and 21 are lined up with the front edge of the box wall to receive the same in the groove means 22 and 23 as the base plate 2 is moved rearwardly relative to the front open wall 19 of box 6. When the front edge portions are fully seated in groove means 22 and 23, the rearward flange 26 which extends at substantially a 90 degree angle or less from the rearward extension 24 just clears the rearward edge of the wall on which the locking device is being mounted. Pressure is then applied to the rearward extension 24 in a direction inwardly of the wall on which the locking device is being mounted, whereupon the rearward flange 26 grippingly and frictionally slides along the rear wall 25 until the rearward extension 24 abuts solidly and fully against the wall of the box 6 on which the locking device is being mounted. The resilient fingers or arms 7 and 8 project outwardly from the box wall at an acute angle starting from a rearward portion of the box and extending in a direction toward the front of the box.

In like manner, a similar locking device 1 is mounted on the opposite box wall.

The wall bracket 13 (or 130 or 1300) may then be coupled to the locking device by means of screw 15 through the aperture of leg 13a (or 130a or 1300a) and received in the threaded (or frictionally retaining) aperture of tab 14 (or of stamped collars 30 or 140).

The box 6 may then be aligned with a precut opening in the mounting wall and inserted by pushing through such opening, at which time the resilient arms or fingers 7 and 8 (or 70 and 80) flex inwardly toward the box wall on which they are mounted enabling the locking device to clear the edge of the mounting wall opening. As soon as the free ends 11 and 12 of the resilient arms clear the inner edge of the mounting wall opening, the resilient arms 7 and 8 (or 70 and 80) snap back to their original outwardly extending position at which time they face the inner surface of the mounting wall and abut thereagainst when the box 6 is moved in the opposite or withdrawal direction.

The screws 15 are then tightened, i.e. rotated in the direction which draws the leg 13a (or 130a or 1300a) of wall bracket 13 (or 130 or 1300) toward the free ends 11 and 12 of the resilient arms 7 and 8, and sandwiches the corresponding edge portions of the mounting wall therebetween. The screws 15 are tightened until the desired gripping force is obtained on the mounting wall edge portions sandwiched between the leg 13a (or 130a or 1300a) of wall bracket 13 (or 130 or 1300) and the free ends 11 and 12 of resilient arms 7 and 8, and until the desired box setting is obtained, i.e. flush with the outer surface of the mounting wall.

In other modifications, the locking devices 1 may be preassembled to the wiring device boxes 6 at the factory by riveting the base plates 2 to opposite side walls of the box 6.

In still other modifications, the locking devices may be attached to the box walls by using already available screws which were part of the original wiring device box construction, as explained and described with reference to the modifications shown in FIG. 4, FIG. 7, FIG. 8, FIG. 9, FIG. 10, FIG. 11 and FIG. 16.

The locking devices in accordance with this invention are preferably made of metal such as steel or an alloy having good strength, resilience, and temperature characteristics. Since the locking devices in accordance with this invention are made separate from the wiring device boxes, they may be attached to either metal boxes or non-metallic boxes, including non-metallic boxes of both thermoplastic and thermoset materials. Thus, lower cost non-metallic boxes may be used where appropriate and yet the advantages of stronger, more resilient, less temperature sensitive metal snap-in locking devices can be retained by using the locking devices in accordance with this invention on non-metallic boxes.

I claim:

1. A locking device for an electrical wiring device box, comprising a base lying in a first base plane for positioning against a wall of said wiring device box, said wall of said wiring device box having a front edge bordering an open front wall of said wiring device box and a rear edge bordering a rear wall of said wiring device box, first frictional grip means extending from said base to frictionally grip a front edge portion of said wall of said wiring device box when said locking device is mounted thereon, second frictional grip means extending from said base to frictionally grip a rear edge portion of said wall of said wiring device box when said locking device is mounted thereon, and resilient arm means extending from said base, said resilient arm means including a first end portion secured to said base and a second free end portion normally spaced apart outwardly from said first base plane and capable of being flexed inwardly toward said base plane, said second free end portion of said resilient arm means being closer to said front edge of said wiring device box than said first end portion when said locking device is mounted on said wiring device box.

2. A locking device for an electrical wiring device box as set forth in claim 1, including a wall bracket and coupling means to couple said wall bracket to said locking device in facing relationship with said second free end of said resilient arm means.

3. A locking device for an electrical wiring device box as set forth in claim 1, wherein said first frictional grip means includes an L-shaped member, a first leg thereof extending laterally from said base and a second leg thereof extending from said first leg in a second plane substantially parallel to said first base plane, said L-shaped member thereby providing groove means to frictionally receive and grip said front edge portion of said wall of said wiring device box when said locking device is mounted thereon.

4. A locking device for an electrical wiring device box as set forth in claim 1, wherein said second frictional grip means includes a rear grip flange extending in a third plane rearwardly of said base, said third plane being at an angle to said first base plane, said rear grip flange extending from said first base plane in a direction opposite to that from which said second free end portion of said resilient arm means is spaced from said first base plane.

5. A locking device for an electrical wiring device box as set forth in claim 4, wherein said angle is substantially ninety degrees.

6. A locking device for an electrical wiring device box as set forth in claim 4, wherein said rear grip flange includes an inward facing frictional gripping surface for frictional gripping engagement with said rear edge portion of said wall of said wiring device box when said locking device is mounted thereon as well as with a portion of said rear wall of said wiring device box, said angle formed between said inward facing frictional gripping surface and said base being less than ninety degrees.

7. A locking device for an electrical wiring device box as set forth in claim 1, wherein said resilient arm means includes a pair of spaced apart resilient arm members, each of said arm members including a first end integrally joined to said base, each of said arm members including a second free end normally spaced apart outwardly from said first base plane an equal distance and capable of being flexed inwardly toward said base plane, said second free ends of said arm members each being an equal distance from said front edge of said wiring device box when said locking device is mounted thereon.

8. A locking device for an electrical wiring device box as set forth in claim 7, including a cross member extending between said free ends of said pair of spaced apart resilient arm members.

9. A locking device for an electrical wiring device box as set forth in claim 2, wherein said wall bracket includes a first wall bearing plate, a first aperture through said plate, said locking device includes a tab extending in a fourth plane, said fourth plane being at substantially right angles to said first base plane, an internally threaded second aperture through said tab, said first aperture of said wall bearing plate being aligned with said threaded second aperture through said tab, and a screw extending through said first aperture being threadedly received in said second internally threaded aperture, said tab, apertures and said screw comprising said coupling means.

10. A locking device for an electrical wiring device box as set forth in claim 9, wherein said tab extends outwardly from said first base plane in the same direction as said second free end portion of said resilient arm means is spaced from said first base plane.

11. A locking device for an electrical wiring device box as set forth in claim 9, wherein said tab extends inwardly from said first base plane in the opposite direction from that in which said second free end portion of said resilient arm means is spaced from said first base plane.

12. A locking device for an electrical wiring device box as set forth in claim 10, wherein said wall bracket includes a second plate, said second plate extending from said first wall bearing plate at substantially a right angle, said second plate extending in a direction toward said rearwardly positioned second frictional grip means and in a fifth plane, said fifth plane being substantially parallel to said first base plane and spaced apart therefrom a preselected distance in the direction opposite from that in which said second free end portion of said resilient arm means is spaced from said first base plane, said preselected distance being substantially equal to the thickness of said wiring device box wall on which said locking device is mounted, a frictional gripping groove being thereby formed between said second plate and the corresponding spaced apart portion of said base to frictionally and grippingly receive a front edge portion of said wall of said wiring device box when said locking device is mounted thereon and said wall bracket is coupled thereto.

13. A locking device for an electrical wiring device box as set forth in claim 2, wherein said coupling means includes an apertue through said wall bracket, collar means formed on said base having a bore therethrough, said aperture being aligned with said bore, and a screw through said aperture receivable in said bore, retainable therein and removable therefrom.

14. A locking device for an electrical wiring device box as set forth in claim 13, wherein said collar means includes a strip of material severed along each side from the body portion of said base, each end of said strip remaining integrally joined to said body portion of said base, the intermediate portions of said strip being raised from said first base plane in an arcuate configuration to form said bore.

15. A locking device for an electrical wiring device box, comprising a base lying in a first base plane for positioning against a wall of said wiring device box, said wall of said wiring device box having a front edge bordering an open front wall of said wiring device box and a rear edge bordering a rear wall of said wiring device box, support means extending from said base to bear against a front edge portion of said wall of said wiring device box when said locking device is mounted thereon, securing means to secure said base to said wall, and resilient arm means including a first end portion secured to said base and a second free end portion normally spaced apart outwardly from said first base plane and capable of being flexed inwardly toward said base plane, said second free end portion of said resilient arm means being closer to said front edge of said wiring device box than said first end portion when said locking device is mounted on said wiring device box.

16. A locking device for an electrical wiring device box as set forth in claim 15, wherein said securing means includes an aperture in said base formed to receive therethrough the head of an existing screw of said wiring device box and a smaller slotted portion formed in said base opening to said aperture to receive the shank of said screw.

17. A locking device for an electrical wiring device box as set forth in claim 15, wherein said securing means is detachable and includes a screw.

18. A locking device for an electrical wiring device box as set forth in claim 15, wherein said securing means includes rivets to non-detachably secure said locking device to said wiring device box.

19. A locking device for an electrical wiring device box as set forth in claim 1, wherein said free end of said resilient arm means is spaced apart rearwardly of said front edge of said wiring device box a preselected distance when said locking device is mounted on said wiring device box.

20. A locking device for an electrical wiring device box as set forth in claim 19, wherein said preselected distance is substantially equal to the thickness of the wall in which said wiring device box is to be mounted.

21. A locking device for an electrical wiring device box as set forth in claim 19, wherein said preselected distance is less than the thickness of the wall in which said wiring device box is to be mounted.

* * * * *